(12) United States Patent
Lee et al.

(10) Patent No.: US 8,233,122 B2
(45) Date of Patent: Jul. 31, 2012

(54) LIQUID CRYSTAL DISPLAY DEVICE

(75) Inventors: Jae Kyun Lee, Gunpo-shi (KR); Dong Hoon Lee, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 12/835,551

(22) Filed: Jul. 13, 2010

(65) Prior Publication Data

US 2010/0277682 A1    Nov. 4, 2010

Related U.S. Application Data

(62) Division of application No. 10/877,728, filed on Jun. 25, 2004, now Pat. No. 7,777,851.

(30) Foreign Application Priority Data

Jun. 26, 2003  (KR) .............................. 10-2003-42028

(51) Int. Cl.
*G02F 1/1343* (2006.01)
*G02F 1/136* (2006.01)
(52) U.S. Cl. ......................................... 349/139; 349/43
(58) Field of Classification Search .................... 349/43, 349/44, 139
See application file for complete search history.

(56) References Cited

U.S. PATENT DOCUMENTS

| | | | |
|---|---|---|---|
| 5,808,706 | A | 9/1998 | Bae |
| 6,075,505 | A | 6/2000 | Shiba et al. |
| 6,707,441 | B1 | 3/2004 | Hebiguchi et al. |
| 7,602,465 | B2 * | 10/2009 | Kim et al. ..................... 349/141 |
| 2002/0021381 | A1 * | 2/2002 | Yoo et al. ......................... 349/43 |
| 2002/0097364 | A1 * | 7/2002 | kwon et al. .................... 349/139 |
| 2002/0154084 | A1 * | 10/2002 | Tanaka et al. ................... 345/92 |

FOREIGN PATENT DOCUMENTS

| | | |
|---|---|---|
| JP | 2002-190605 | 7/2002 |
| KR | 1999-0080838 | 11/1999 |

OTHER PUBLICATIONS

Office Action issued in corresponding Korean Patent Application No. 10-2003-0042028; dated Aug. 23, 2006.

* cited by examiner

*Primary Examiner* — Richard Kim
*Assistant Examiner* — David Chung
(74) *Attorney, Agent, or Firm* — Brinks Hofer Gilson & Lione

(57) ABSTRACT

A liquid crystal display device has pixel regions defined by gate lines and data lines perpendicular to the gate lines. The gate electrodes of thin film transistors (TFTs) at a first side of the data lines project from the gate lines. Active layers are disposed on the gate electrodes. Source electrodes overlap the active layers. Drain electrodes are parallel to the gate lines, spaced from the source electrodes and overlap the active layers. Pixel electrodes formed on the pixel region are connected to the drain electrodes. This structure prevents poor picture quality by minimizing the differences between the parasitic capacitance formed between the gate electrode and the drain electrode in adjacent pixel regions even if Y- or X-axis misalignment occurs.

20 Claims, 13 Drawing Sheets

LIQUID CRYSTAL DISPLAY DEVICE

The present patent document is a divisional of U.S. patent application Ser. No. 10/877,728, filed Jun. 25, 2004, which claims priority of the Korean Application No. P2003-0042028 filed on Jun. 26, 2003, which are hereby incorporated by reference.

BACKGROUND OF THE INVENTION

1. Field of the Invention

The present invention relates to liquid crystal display devices, and more particularly, to a liquid crystal display device which is suitable for improving a picture quality by minimizing a Cgd variation in a liquid crystal panel even if there is a misalignment in the Y- or X-axis.

2. Background of the Related Art

To keep pace with development of the current information-oriented society, various improvements in display devices have been required. To meet these demands, various flat display devices, such as LCD (Liquid Crystal Display), PDP (Plasma Display Panel), ELD (Electro Luminescent Display), VFD (Vacuum Fluorescent Display), have been studied.

Of the various display devices, currently the LCD is used in a vast majority of mobile display devices owing to advantages that include good picture quality, light weight, thin, and low power consumption. The LCD has also been replacing the CRT (Cathode Ray Tube) in various applications. More particularly, besides the mobile display devices, such as monitors for notebook computers, the LCD has been developed as monitors for televisions for receiving, and displaying a broadcasting signal, and monitors for computers.

Despite of various technical developments for the LCD to serve as display devices in various fields, efforts for enhancing the picture quality as a kind of display device are contradictory to above advantages in many aspects.

Therefore, for using the LCD in various fields as general display devices, high definition, high luminance, and large sized picture, while the features of light weight, thin, and low power consumption are maintained.

Such a LCD is provided with a liquid crystal panel for displaying a picture, and a driving part for applying a driving signal to the liquid crystal panel. The liquid crystal panel is provided with upper, and lower substrates bonded together with a space between the substrates, and a liquid crystal layer between the upper, and the lower substrates.

The lower substrate (a TFT array substrate) is provided with a plurality of gate lines arranged at regular intervals in one direction, a plurality of data lines arranged at regular intervals perpendicular to the gate lines, a plurality of pixel electrodes on every pixel region defined at every cross of the gate lines and the data lines in a form of matrix, and a plurality of thin film transistors (TFT) to be switched in response to a signal on the gate line for transmission of a signal on the data line to each pixel electrode.

On the upper substrate (a color filter substrate), there are a black matrix layer for shielding a light to parts excluding the pixel regions, R, B, G color filter layers for displaying colors, and a common electrode Vcom for displaying a picture.

The upper substrate and the lower substrate are bonded with sealant with a space between the substrates provided by means of spacers. The space is filled with the liquid crystal.

In fabrication of the LCD, rather than one liquid crystal panel being fabricated for each substrate, a plurality of liquid crystal panels are fabricated at the same time out of one large substrate. The number of liquid crystal panels depends on the size of the substrate and the size of the liquid crystal panel.

An equivalent circuit of a unit pixel on the lower substrate of the LCD will be described. FIG. 1 illustrates a related art equivalent circuit of a unit pixel in a TFT-LCD.

Referring to FIG. 1, the thin film transistor (TFT) has a drain electrode connected to an adjacent pixel electrode 'P', a gate electrode 'g' connected to a gate line 'Gn', and a source electrode 's' connected to a data line Dm.

There is the liquid crystal between the pixel electrode 'P' and the common electrode Vcom. Parasitic capacitance Cgd is formed between the gate electrode 'g' and the drain electrode 'd' caused by misalignment, and the like. A liquid crystal capacitance Clc and storage capacitance act as a load that the TFT-LCD is required to drive.

The operation of the TFT-LCD will be described.

After applying a gate turn-on voltage to the gate electrode 'g' connected to a gate line 'Gn' intending to display, to make the TFT 10 conductive, a data voltage of a picture signal is applied to the source electrode 's', so that the data voltage is provided to the drain electrode 'd'.

According to this, the data voltage is provided both to the liquid crystal capacitance Clc and the storage capacitance through the pixel electrode 'P', to form an electric field dependent on a voltage difference between the pixel electrode and the common electrode Vcom.

In general, a plurality of the equivalent circuits in FIG. 1 are formed on the lower substrate of the LCD, and all the TFTs on the pixel regions have the same structures, and are oriented in the same direction. Therefore, even if a misalignment exists between layers, since all characteristics of the pixel regions (particularly, the parasitic capacitance Cgd caused by an overlapped area of the gate electrode and the drain electrode) are reduced or increased at the same time, there is no problem of picture quality drop caused by this.

However, the formation of the TFTs in the pixel regions in the same structures and orientation causes a problem of large power consumption. In order to reduce the power consumption, a technique is suggested in which the TFTs are formed, not in the same structures and orientation, but in a zigzag forms. A related art LCD in which the TFTs are arranged in a zigzag form will be described.

FIG. 2 illustrates a circuit of a TFT array of a related art LCD, FIG. 3 illustrates a layout of an LCD in FIG. 2, and FIG. 4 illustrates a layout when a misalignment occurs in a Y-axis direction in the layout of FIG. 3. At first, a related art TFT array circuit will be described.

Referring to FIG. 2, the related art TFT array circuit has a plurality of gate lines G1~Gn arranged in one direction, a plurality of common lines Vcom 1~Vcom n−1 arranged parallel to, and between the gate lines, a thin film transistor TFT at every crossing of the gate lines and the data lines having a gate electrode connected to the gate line, and a source electrode connected to the data line, and a liquid crystal capacitance capacitor Clc and storage capacitance capacitor Cst between the common line, and a drain electrode of the thin film transistor.

The TFTs are arranged such that pixel regions on the same horizontal line are driven by two adjacent gate lines, and pixel regions on the same vertical line are driven by one data line. That is, of pixel regions on the same horizontal line, odd numbered pixel regions are driven by an (n−1)th gate line Gn−1, and even numbered pixel regions are driven by an (n)th gate line Gn.

A layout of the foregoing related art TFT array will be described, taking adjacent gate lines and a TFT connected thereto as an example.

Referring to FIG. 3, the related art LCD is provided with first and second gate lines 30a and 30b arranged in one direction parallel to each other on a lower substrate, a common line 30c between, parallel to, and on the same layer with the first and second gate lines 30a and 30b, first and second data lines 34a and 34b arranged perpendicular to the first and second gate lines 30a and 30b to define first and second pixel regions, a first active layer 33a on the first gate line 30a adjacent to a right side of the first data line 34a, a first source electrode 35a of a 'U' form projected to a right side from the first data line 34a to overlap the first active layer 33a, a first drain electrode 36a arranged in a Y-axis direction opposite to, and spaced from the first source electrode 35a and overlapping the first active layer 33a, a first pixel electrode 37a on the first pixel region so as to be connected to the first drain electrode 36a through a first contact hole 38a, a second active layer 33b on the second gate line 30b adjacent to a right side of the second data line 34b, a second source electrode 35b of an inverted 'U' form projected to a right side from the second data line 34b to overlap the second active layer 33b, a second drain electrode 36b arranged in the Y-axis direction opposite to, and spaced from the source electrode 35b overlap the second active layer 33b, and a second pixel electrode 37b on the second pixel region so as to be connected to the second drain electrode 36b through the second contact hole 38b.

The first pixel electrode 37a and the second pixel electrode 37b overlap the common line 30c form first and second storage capacitors in the first and second pixel regions, respectively.

The first and second gate lines under the first and second active layers 33a and 33b act as first and second gate electrodes, respectively, the first gate electrode, the first source electrode 35a, and the first drain electrode 36a form a first thin film transistor TFT1 in combination, and the second gate electrode, the second source electrode 35b, and the second drain electrode 36b form a second thin film transistor TFT2 in combination.

According to above structure, channel regions of the first and second thin film transistors TFT1, and TFT2 have 'U' forms, respectively.

Thus, pixel regions on the same horizontal line are driven by adjacent two gate lines, and pixel regions on the same vertical line are driven by one data line. According to this, the thin film transistors are arranged at upper, and lower sides of the same gate line in zigzag.

Referring to FIG. 4, if the TFTs are arranged such that pixel regions on the same horizontal line are driven by two adjacent gate lines, if misalignment occurs in the Y-axis direction, an overlapped area of the first gate electrode and the first drain electrode 36a of the first TFT1 and an overlapped area of the second gate electrode and the second drain electrode of the second TFT2 on the pixel region adjacent to the pixel region of the first TFT1 become different, and cause a difference in the Cgd.

In other words, as shown in FIG. 4, when the data lines 34a, and 34b, and the source/drain electrodes 35a, 35b, 36a, and 36b shift to a + direction of the Y-axis due to misalignment, since an overlap area (hatch part) of the first gate line 30a and the first drain electrode 36a becomes smaller, and an overlap area (hatch part) of the second gate line 30b and the second drain electrode 36b becomes larger, there is a difference of parasitic capacitances between gates and drains in adjacent pixel regions.

Next, a related art LCD will be described.

FIG. 5 illustrates a circuit of a TFT array of other related art LCD, FIG. 6 illustrates a layout of the LCD of FIG. 5, and FIG. 7 illustrates a layout when misalignment occurs in the layout of FIG. 6 in an X-axis direction.

Referring to FIG. 5, a TFT array circuit having applied to other related art LCD is provided with a plurality of gate lines G1 Gn arranged in one direction, a plurality of common lines Vcom 1~Vcom n arranged between, and parallel to the gate lines, a plurality of data lines D1~Dm arranged perpendicular to the gate lines, and thin film transistors TFTs arranged at left and right sides of the data line in zigzag.

In this instance, the thin film transistors are arranged at left and right sides of the data line in zigzag so that pixel regions on the same horizontal line are driven by the same gate line, and pixel regions on the same vertical line are driven by adjacent two data lines. That is, two adjacent thin film transistors on the same vertical line are driven by different gate lines and different data lines, and connected to respective common lines to form first and second capacitors having a liquid crystal capacitance Clc and a storage capacitance Cst.

A layout of the foregoing related art TFT array will be described, taking two TFTs connected to a data line and adjacent tow gate lines as an example.

Referring to FIG. 6, the related art TFT array is provided with first and second gate lines 30a and 30b arranged in one direction parallel to each other on a lower substrate, a common line 30c between, parallel to, and one the same layer with the first and second gate lines 30a and 30b, a data line 34 arranged perpendicular to the first and second gate lines 30a and 30b to define pixel regions, a first gate electrode 32a projected to a left side of the data line 34 from one side of the first gate line 30a, a second gate electrode 32b projected to a right side of the data line 34 from one side of the second gate line 30b, first and second active layers 33a and 33b formed on the first and second gate electrodes 32a and 32b respectively, a first source electrode 35a of a '⊐' form projected to a left side from the data line 34 to overlap the first active layer 33a, a first drain electrode 36a arranged in an X-axis direction (a direction parallel to the gate line) spaced from the first source electrode 35a and overlap the first active layer 33a, a first pixel electrode 37a on the pixel region connected to the first drain electrode 36a through a first contact hole 38a, a second source electrode 35b of a '⊂' form projected to a right side from the data line 34 to overlap the second active layer 33b, a second drain electrode 36b arranged in the X-axis direction spaced from the second source electrode 35b and overlap the second active layer 33b, and a second pixel electrode 37b on the pixel region connected to the second drain electrode 36b through the second contact hole 38b.

The pixel electrodes 37a and 37b overlap the common line 30c form storage capacitors, respectively.

The first gate electrode 32a, the first source electrode 35a, and the first drain electrode 36a form a first thin film transistor TFT1 in combination, the second gate electrode 32b, the second source electrode 35b, and the second drain electrode 36b form a second thin film transistor in combination. According to this, channel regions of the first and second thin film transistors have the '⊐' and '⊂' forms, respectively.

Referring to FIG. 7, when the TFTs are arranged at opposite sides of the data line, if the misalignment occurs in the X-axis direction, overlapped areas (hatched parts) of the gate electrode and the drain electrode on adjacent pixel regions differ, to cause a Cgd difference.

In other words, as shown in FIG. 7, in case the data line 34 and the source/drain electrodes 35a, 35b, 36a, and 36b shift in a '-' direction of the X-axis direction due to misalignment, since an overlapped area (a hatched part) of the first gate electrode 32a and the second drain electrode 36a becomes small, and an overlapped area (a hatched part) of the second gate electrode 32b and the second drain electrode 36b becomes larger, a difference of the parasitic capacitances is formed between the gate and the drain on adjacent pixel regions.

Thus, the related art LCD having a structure shown in FIG. 3 or 4 has a Cgd difference between adjacent pixel regions when misalignment occurs in the Y- or X-axis direction, respectively, thereby decreasing the picture quality.

SUMMARY OF THE INVENTION

Accordingly, a liquid crystal display device is provided which prevents poor picture quality by minimizing the Cgd difference between adjacent pixel regions even if misalignment occurs in the Y- or X-axis direction.

As embodied and broadly described herein, in one aspect, the liquid crystal display device includes first and second gate lines and first and second data lines arranged perpendicular to the first and second gate lines to define pixel regions. A first gate electrode of the first thin film transistor at a first side of the first data line is projected from the first gate line and a second gate electrode of a second thin film transistor at the first side of the second data line is projected from the second gate line. First and second active layers are disposed on the first and second gate electrodes respectively. A first source electrode of the first thin film transistor is disposed on the first side of the first data line to overlap the first active layer, and a first drain electrode of the first thin film transistor is arranged in a direction parallel to the gate line so as to be spaced from the first source electrode and overlap the first active layer. A first pixel electrode is formed on the first pixel region so as to be connected to the first drain electrode. Similarly, a second source electrode of the second thin film transistor projected to the first side of the second data line to overlap the second active layer, and a second drain electrode of the second thin film transistor is arranged in a direction parallel to the gate line so as to be spaced from the second source electrode and overlap the second active layer. A second pixel electrode is disposed on the second pixel region so as to be connected to the second drain electrode.

The device further includes a common line between, and parallel to the first and second gate lines.

The common line overlaps with the first and second pixel electrodes to form storage capacitors, respectively.

The common line is on the same layer with the first and second gate lines.

The first gate electrode is projected upward from the first gate line, and the second gate electrode is projected to downward from the second gate line.

Both the first and second source electrodes have ' ⊂ ' forms.

The first source electrode has an form, and the second source electrode has an inverted 'L' form.

The first and second drain electrodes respectively overlap the first and second gate electrodes parallel to the gate line, partly.

The first and second thin film transistors have ' ⊂ ' forms of channel regions, respectively.

The first and second thin film transistors are arranged in zigzag such that pixel regions on the same horizontal line are driven by adjacent gate lines.

In another aspect, a liquid crystal display device is provided that includes first and second gate lines and a data line arranged perpendicular to the first and second gate lines to define first and second pixel regions. A first gate electrode of a first thin film transistor at one side of the data line is projected from the first gate line, and a second gate electrode of a second thin film transistor at an opposing side of the data line is projected from the second gate line. First and second active layers are disposed on the first and second gate electrodes, respectively. A first source electrode of the first thin film transistor is projected to the one side of the data line to overlap the first active layer, and a first drain electrode of the first thin film transistor is arranged in a direction parallel to the data line so as to be spaced from the first source electrode and overlap the first active layer. A first pixel electrode is formed on the first pixel region so as to be connected to the first drain electrode. Similarly, a second source electrode of the second thin film transistor is projected to the other side of the data line to overlap the second active layer, and a second drain electrode of the second thin film transistor is arranged in a direction parallel to the data line so as to be spaced from the second source electrode and overlap the second active layer. A second pixel electrode is formed on the second pixel region so as to be connected to the second drain electrode.

The first and second gate electrodes are projected upward from the first and second gate lines, respectively.

Both the first and second source electrodes have 'U' forms.

The first source electrode has a '⌐' form, and the second source electrode has a '⌐' form.

The first and second drain electrodes respectively overlap the first and second gate electrodes parallel to the data line, partly.

The first and second thin film transistors have 'U' forms of channel regions, respectively.

The first and second thin film transistors are arranged such that a data signal is applied to pixel regions on two vertical lines adjacent to the data line in a zigzag form.

In another aspect, the drain electrodes extend parallel with the gate lines in first regions of the liquid crystal display and the drain electrodes extend parallel with the data lines in second regions. In the first regions, adjacent thin film transistors connected to different gate lines are connected to different data lines, and in the second regions, adjacent thin film transistors connected to different gate lines are connected to the same data line.

In another aspect, in the first regions of the liquid crystal display, the gate electrodes and the drain electrodes have shapes such that an offset between the gate electrodes and the drain electrodes in a direction parallel to the data lines affects a capacitance formed between the gate electrodes and the drain electrodes substantially equally, and in the second regions, the gate electrodes and the drain electrodes have shapes such that an offset between the gate electrodes and the drain electrodes in a direction parallel to the gate lines affects a capacitance formed between the gate electrodes and the drain electrodes substantially equally.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 8:
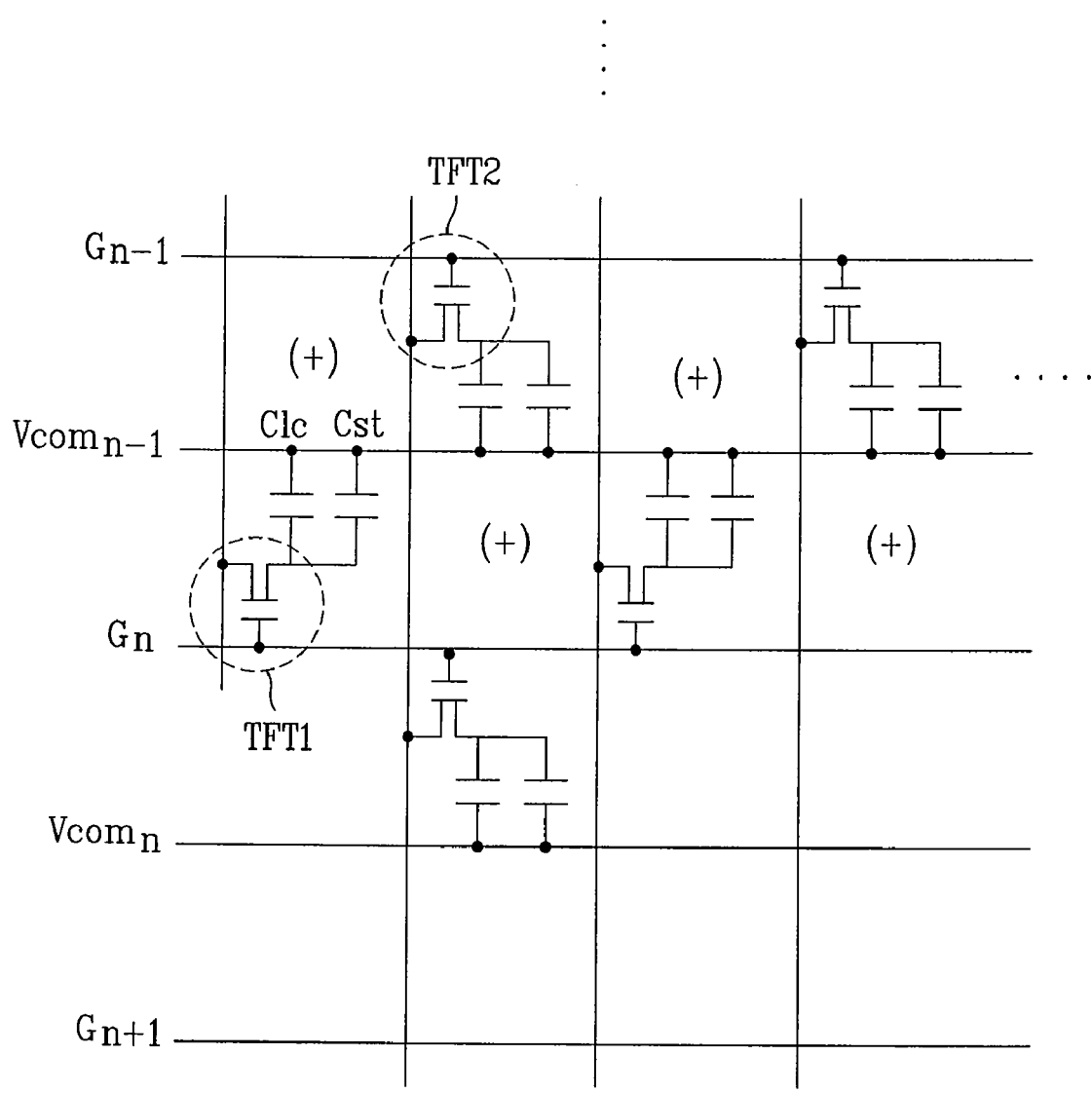
FIG. 8 illustrates a TFT array circuit of an LCD applicable to first or second embodiment of the present invention.

A TFT array circuit applicable to a first or second embodiment of the present invention will be described. FIG. 8 illustrates a TFT array circuit of an LCD applicable to first or second embodiment of the present invention.

Referring to FIG. 8, the TFT array circuit has a plurality of gate lines G1 Gn arranged in one direction, a plurality of common lines Vcom 1~Vcom n−1 arranged parallel to, and between the gate lines, a thin film transistor TFT at every crossing of the gate lines G1~Gn and the data lines D1~Dm having a gate electrode connected to the gate line, and a source electrode connected to the data line, and a liquid crystal capacitance capacitor Clc and a storage capacitance capacitor Cst between the common line, and a drain electrode of the thin film transistor.

The TFTs are arranged at upper and lower sides of the gate line in zigzag such that pixel regions on the same horizontal line are driven by two adjacent gate lines, and pixel regions on the same vertical line are driven by one data line. That is, the TFTs are arranged such that, of pixel regions on the same horizontal line, odd numbered pixel regions are driven by an (n−1)th gate line Gn−1, and even numbered pixel regions are driven by an (n)th gate line Gn.

If the TFTs are arranged at upper and lower sides of the gate line in zigzag, the Cgd difference occurs between the gate electrode and the drain electrode of adjacent pixel regions if misalignment occurs in the Y-axis direction due to different channel shapes in the related art (since the shapes are 'U' and an inverted 'U'). However, if the TFTs are configured as follows, the above problem can be solved even if the TFTs are arranged at upper and lower sides of the gate line in zigzag.

Figure 9:
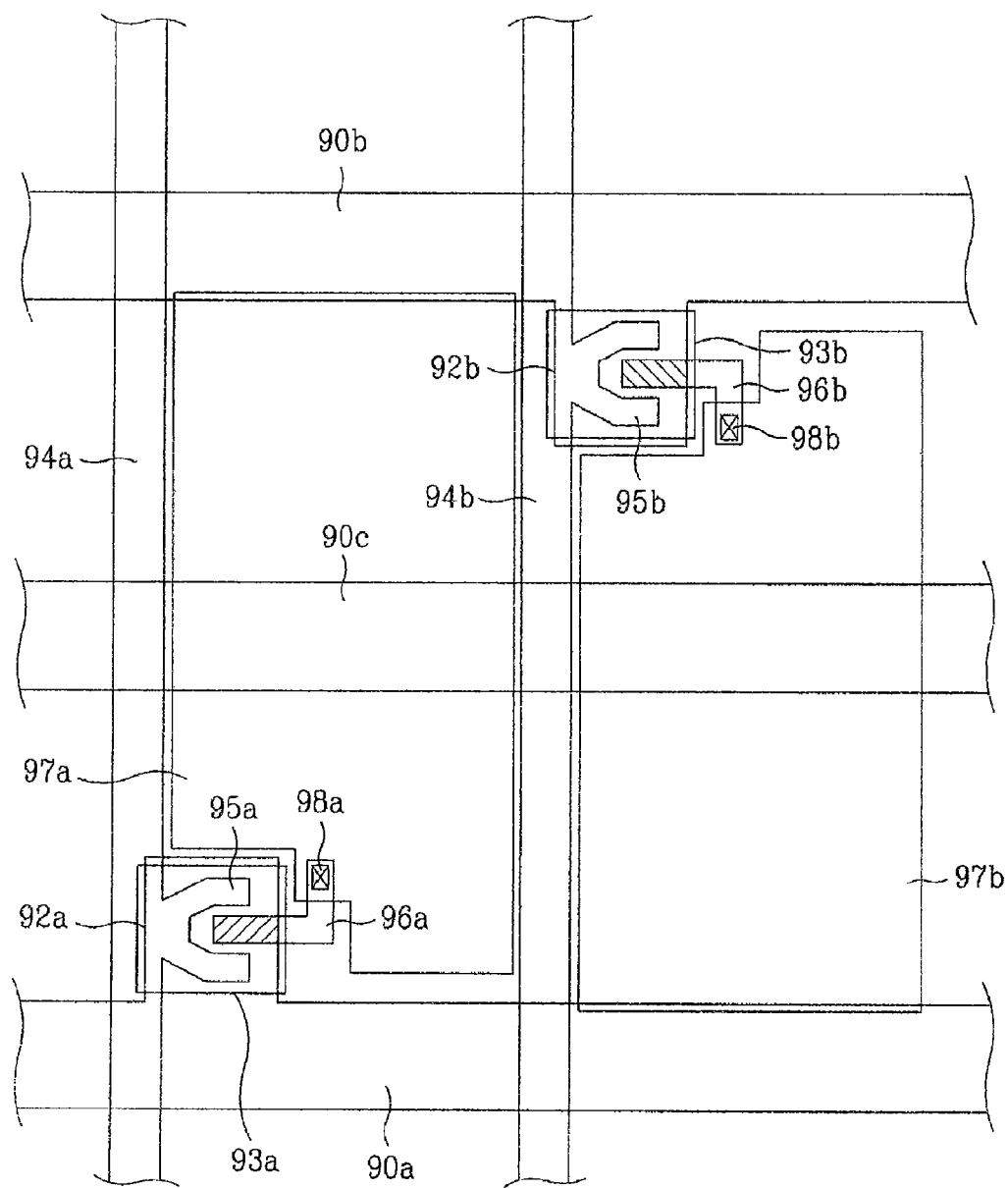
FIG. 9 illustrates a layout of an LCD of FIG. 8 in accordance with a first embodiment of the present invention.

A layout of a TFT array in accordance with a first embodiment of the present invention will be described, taking adjacent gate lines and TFTs connected thereto as an example. FIG. 9 illustrates a layout of an LCD of FIG. 8 in accordance with a first embodiment of the present invention.

Referring to FIG. 9, the LCD in accordance with a first embodiment of the present invention includes first and second gate lines 90a and 90b arranged in one direction parallel to each other on a lower substrate, a common line 90c between, parallel to, and on the same layer as the first and second gate lines 90a and 90b, first and second data lines 94a and 94b arranged perpendicular to the first and second gate lines 90a and 90b to define first and second pixel regions, a first gate electrode 92a at a right side of the first data line 94a projected upward from the first gate line 90a, a second gate electrode 92b at a right side of the second data line 94b projected downward from the second gate line 90b, first and second active layers 93a and 93b on the first and second gate electrodes 92a and 92b respectively, a first source electrode 95a of a '⊃' form projected to a right side from the first data line 94a to overlap the first active layer 93a, a first drain electrode 96a arranged in an X-axis direction so as to be spaced from the first source electrode 95a and overlapping the first active layer 93a, a first pixel electrode 97a on the first pixel region so as to be connected to the first drain electrode 96a through a first contact hole 98a, a second source electrode 95b of a '⊂' form projected to a right side from the second data line 94b to overlap the second active layer 93b, a second drain electrode 96b arranged in the X-axis direction to be spaced from the source electrode 95b and overlap the second active layer 93b, and a second pixel electrode 97a on the second pixel region to be connected to the second drain electrode 96b through a second contact hole 98b.

The first pixel electrode 97a and the second pixel electrode 97b overlap the common line 90c form first and second storage capacitors in the first and second pixel regions, respectively.

The first gate electrode 92a, the first source electrode 95a, and the first drain electrode 96a form a first thin film transistor TFT1 in combination, and the second gate electrode 92b, the second source electrode 95b, and the second drain electrode 96b form a second thin film transistor TFT2 in combination.

Thus, both the first and second source electrodes 95a, and 95b have '⊂' forms, and the first and second drain electrodes 96a and 96b are respectively arranged to overlap the first and second gate electrodes 92a and 92b partly. The overlapped parts of the first and second drain lines 96a and 92b are parallel to the gate line. According to this, both the first and second thin film transistors TFT1, and TFT2 have '⊂' forms of channel regions.

Thus, as the first and second source electrodes 95a and 95b have the same shapes and are projected in the same direction, even if the thin film transistors are arranged in zigzag so that pixel regions on the same horizontal line are driven by two adjacent gate lines, the Cgd formed as the first gate electrode 92a and the first drain electrode 96a of the first thin film transistor TFT1 overlap is the same with the Cgd formed as the second gate electrode 92b and the second drain electrode 96b of the second thin film transistor TFT2 overlap.

That is, since the first and second drain electrodes 96a and 96b do not overlap the first and second gate electrodes 92a and 92b in the Y-axis direction even if misalignment occurs between the source/drain electrodes and the gate electrode in the Y-axis direction, the LCD in accordance with the first embodiment of the present invention does not have a Cgd difference between the first and second thin film transistors TFT1 and TFT2 arranged on the pixel regions adjacent to each other.

Moreover, even if misalignment occurs in the X-axis direction, since increase/decrease of the Cgd's are the same in adjacent pixel regions, there is no Cgd difference between the adjacent pixel regions.

Furthermore, the above configuration enables minimization of a Cgd variation in the liquid crystal panel at the time of Z-inversion, or swing of the common line, to improve the picture quality.

Figure 10:
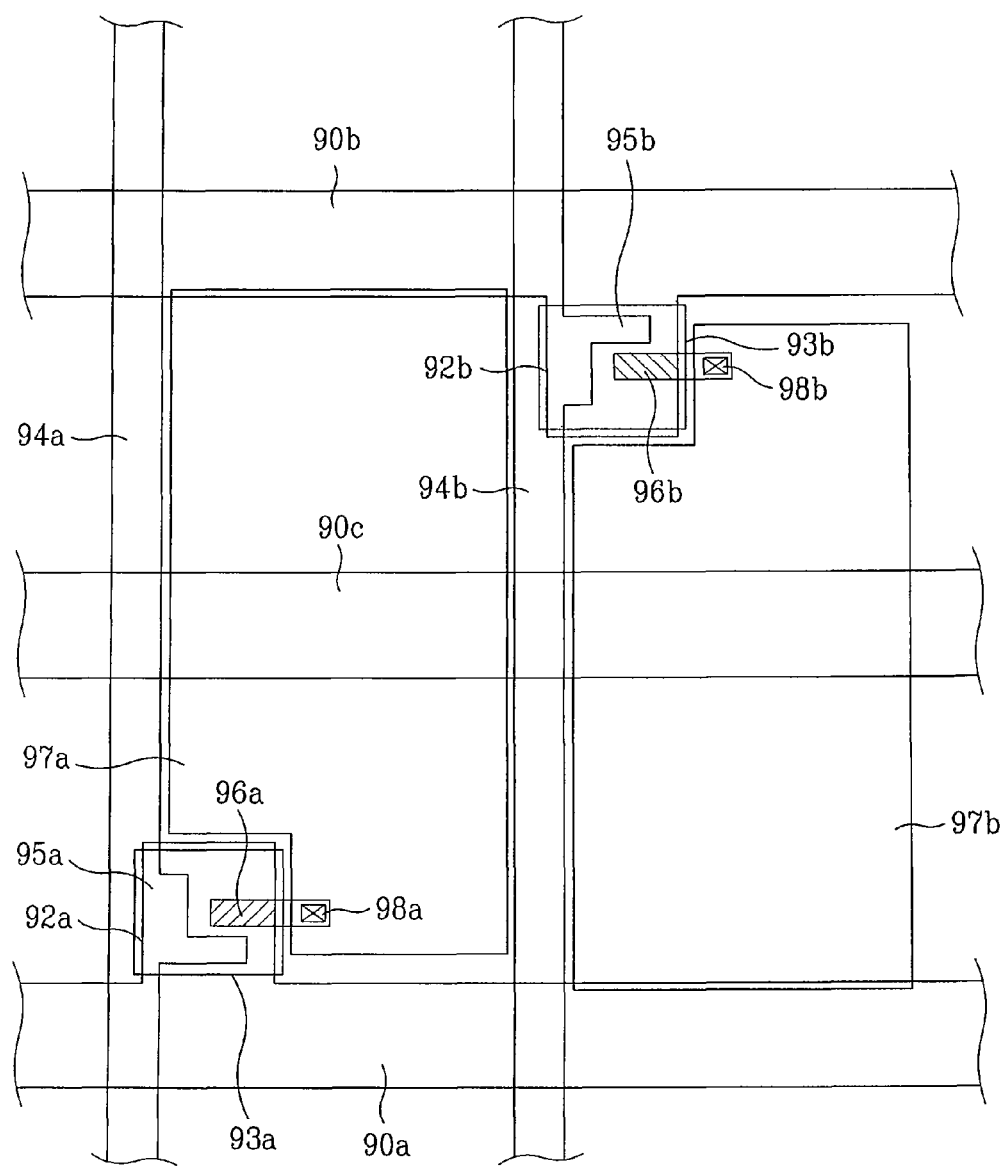
FIG. 10 illustrates a layout of an LCD of FIG. 8 in accordance with a second embodiment of the present invention.

Next, a liquid crystal display device in accordance with a second embodiment of the present invention will be described. FIG. 10 illustrates a layout of an LCD of FIG. 8 in accordance with a second embodiment of the present invention.

Referring to FIG. 10, in the second embodiment of the present invention, the first and second source electrodes 95a and 95b of the first and second thin film transistors TFT1 and TFT2 have 'L' or inverted 'L' forms, respectively. According to this, configuration of the second embodiment is the same with the first embodiment except that respective channels have 'L' or inverted 'L' forms, respectively.

As described in the first embodiment, the second embodiment of the present invention does not have the Cgd difference between the first and second thin film transistors TFT1 and TFT2 arranged in adjacent pixel regions too, even if misalignment occurs between the source/drain electrodes and the gate electrode in the Y-axis direction, because the first and second drain electrodes 96a and 96b have no parts projected in the Y-axis direction and overlapping the first and second gate electrodes 92a and 92b.

Moreover, since increase/decrease of the Cgd's is the same between adjacent pixel regions even if misalignment occurs in the X-axis direction, there is no Cgd difference between the adjacent pixel regions.

Figure 11:
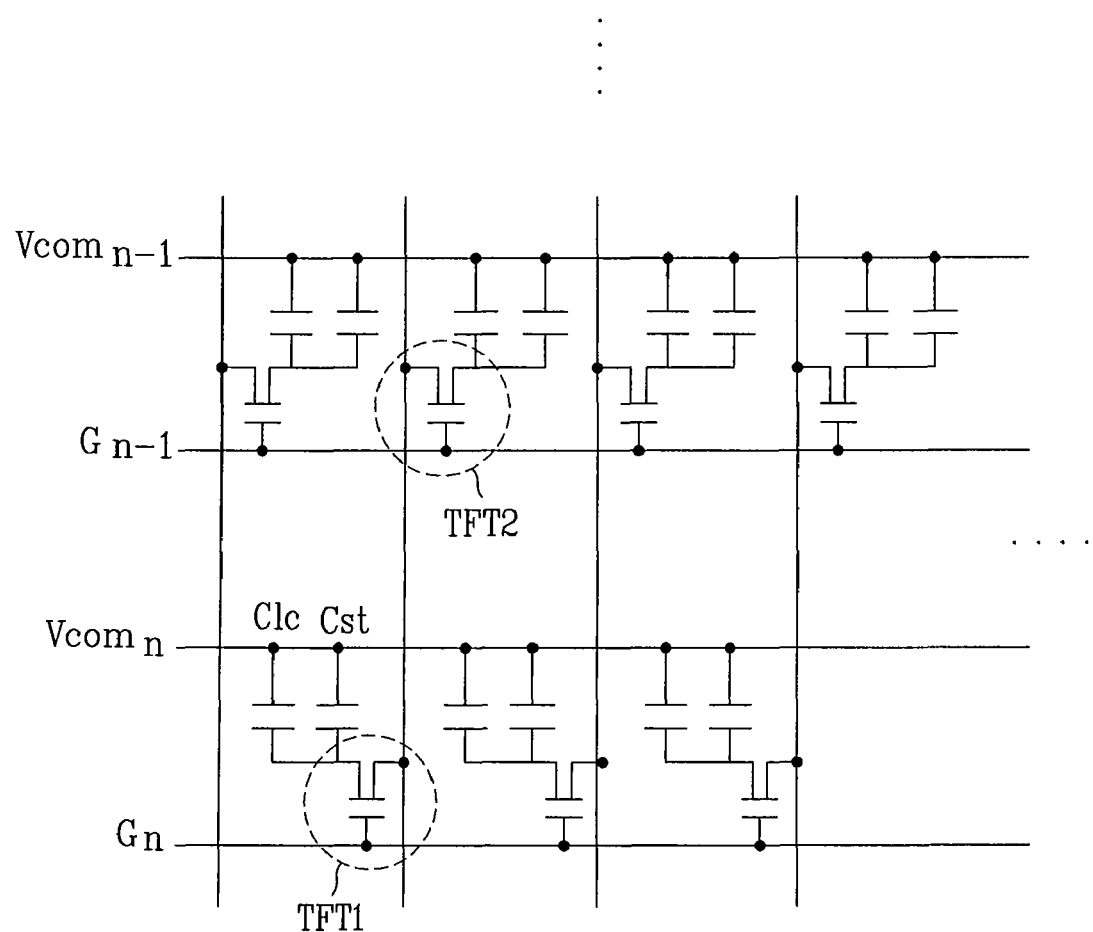
FIG. 11 illustrates a TFT array circuit of an LCD applicable to third or fourth embodiment of the present invention.

A TFT array circuit applicable to third or fourth embodiments of the present invention will be described. FIG. 11 illustrates a TFT array circuit of an LCD applicable to third or fourth embodiments of the present invention.

Referring to FIG. 11, the TFT array circuit includes a plurality of gate lines G1 Gn arranged in one direction, a plurality of common lines Vcom 1~Vcom n arranged parallel to, and between the gate lines, a plurality of data lines D1~Dm arranged perpendicular to the gate lines, a plurality of thin film transistors TFTs arranged such that pixel regions on the same vertical line are driven by one gate line, and pixel regions on the same vertical line are driven by two adjacent data, and a liquid crystal capacitance capacitor Clc and storage capacitance capacitor Cst between the common line and drain electrodes of the thin film transistors. That is, two pixel regions adjacent in a vertical line direction are driven by different gate lines and different data lines, respectively.

Figure 1:
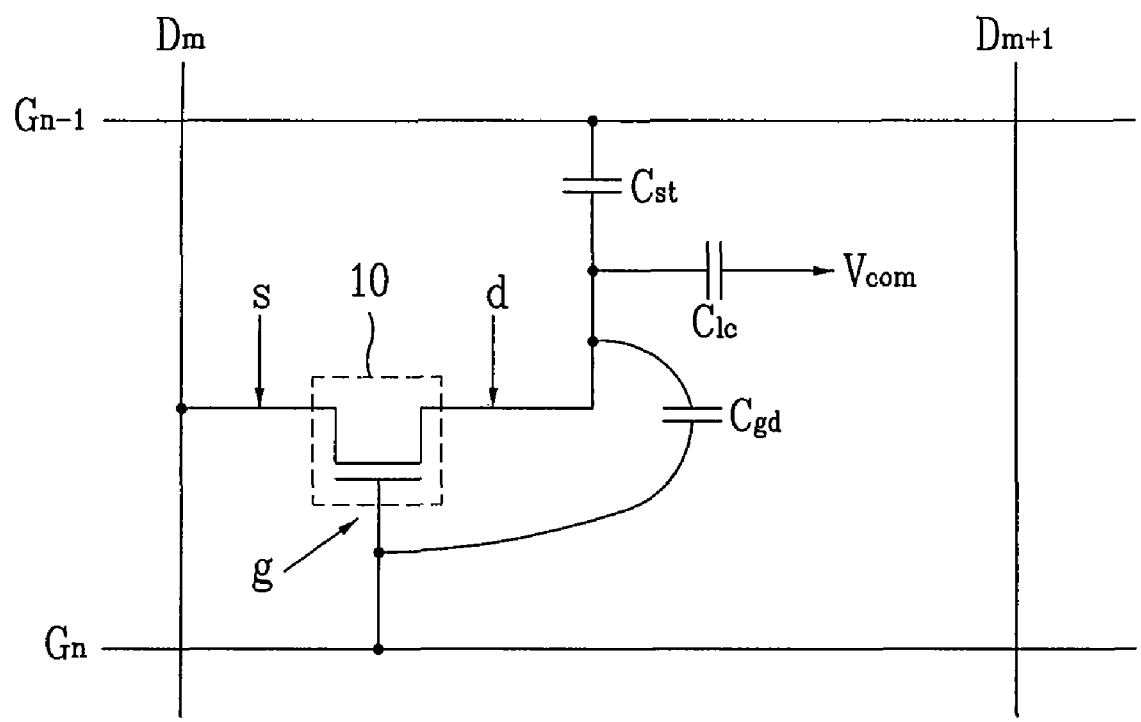
FIG. 1 illustrates a related art equivalent circuit of a unit pixel in a TFT-LCD.
Figure 2:
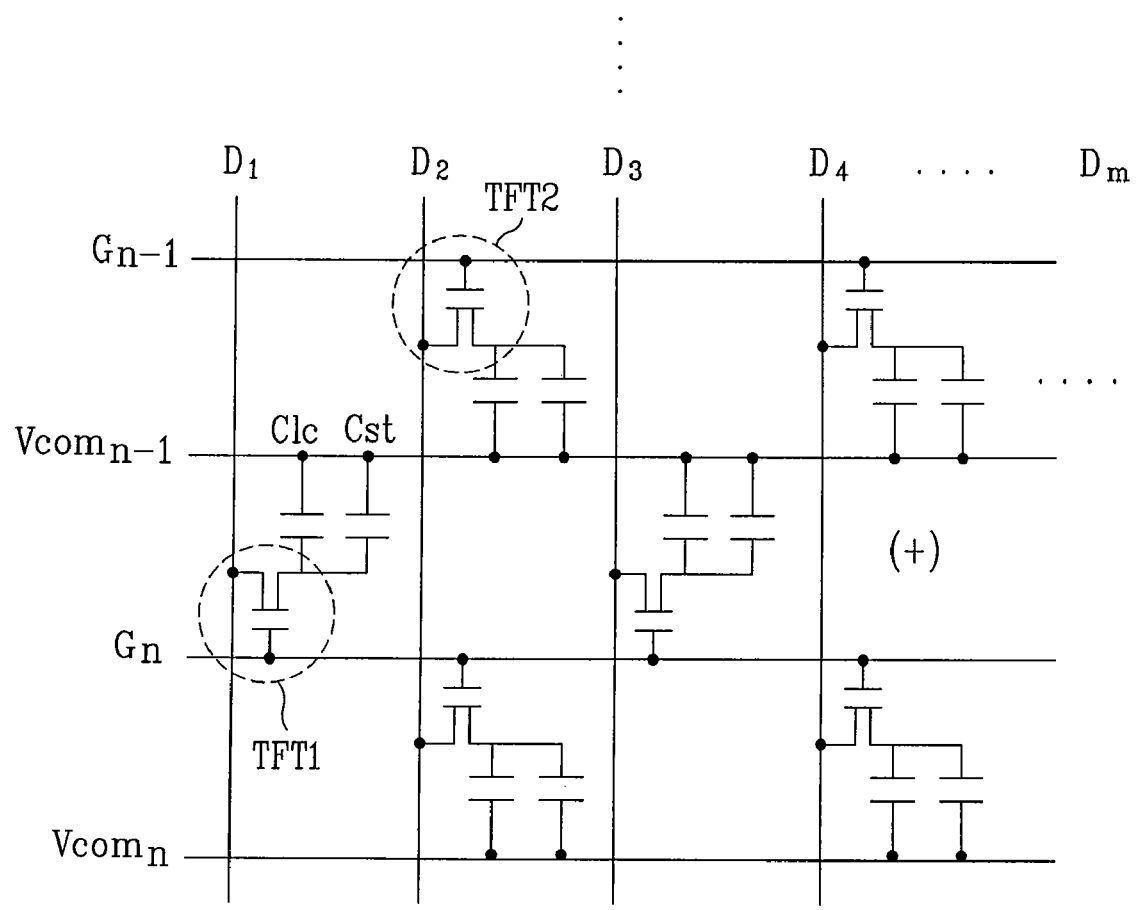
FIG. 2 illustrates a circuit of a TFT array of a related art LCD.
Figure 3:
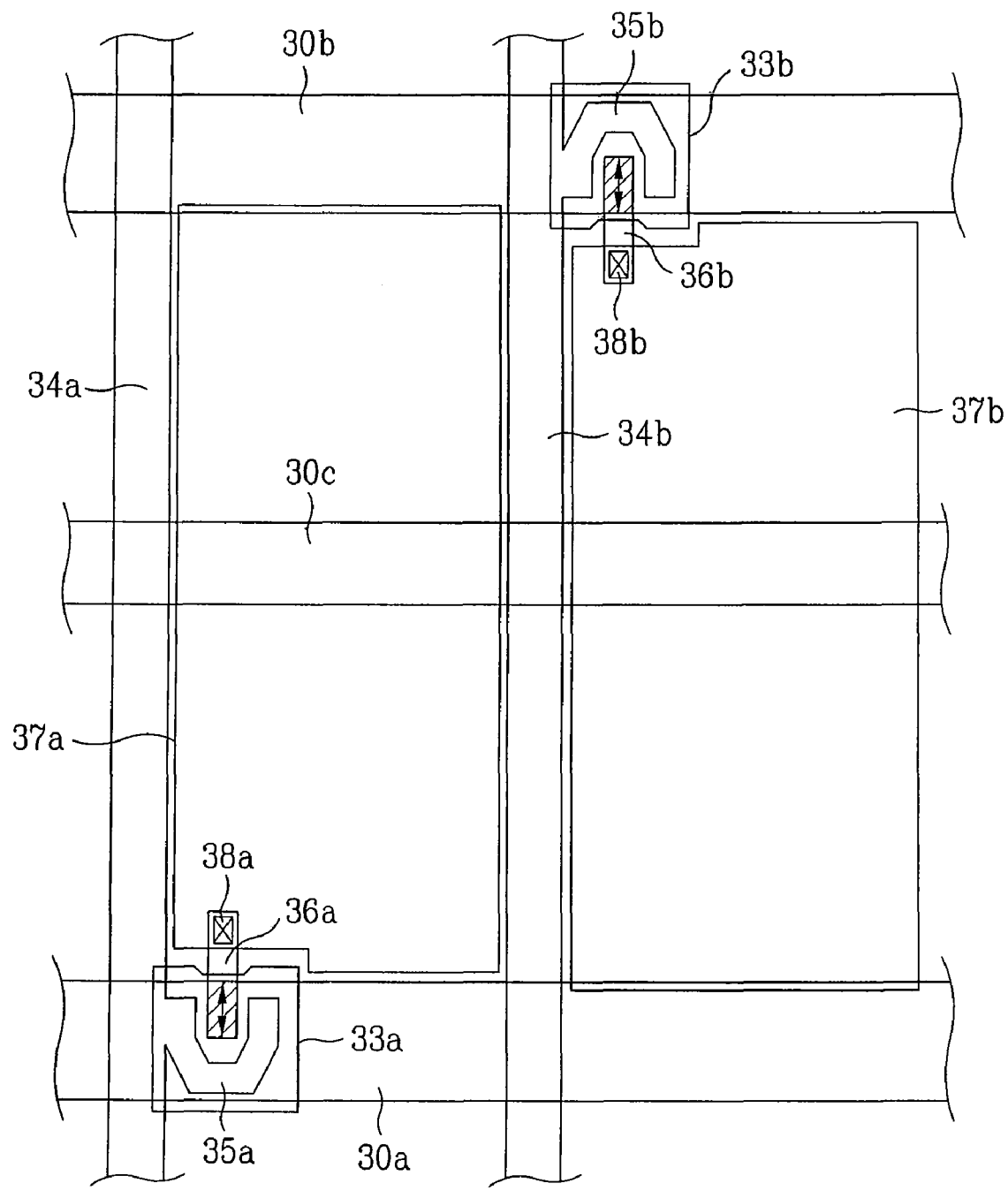
FIG. 3 illustrates a layout of an LCD in FIG. 2.
Figure 4:
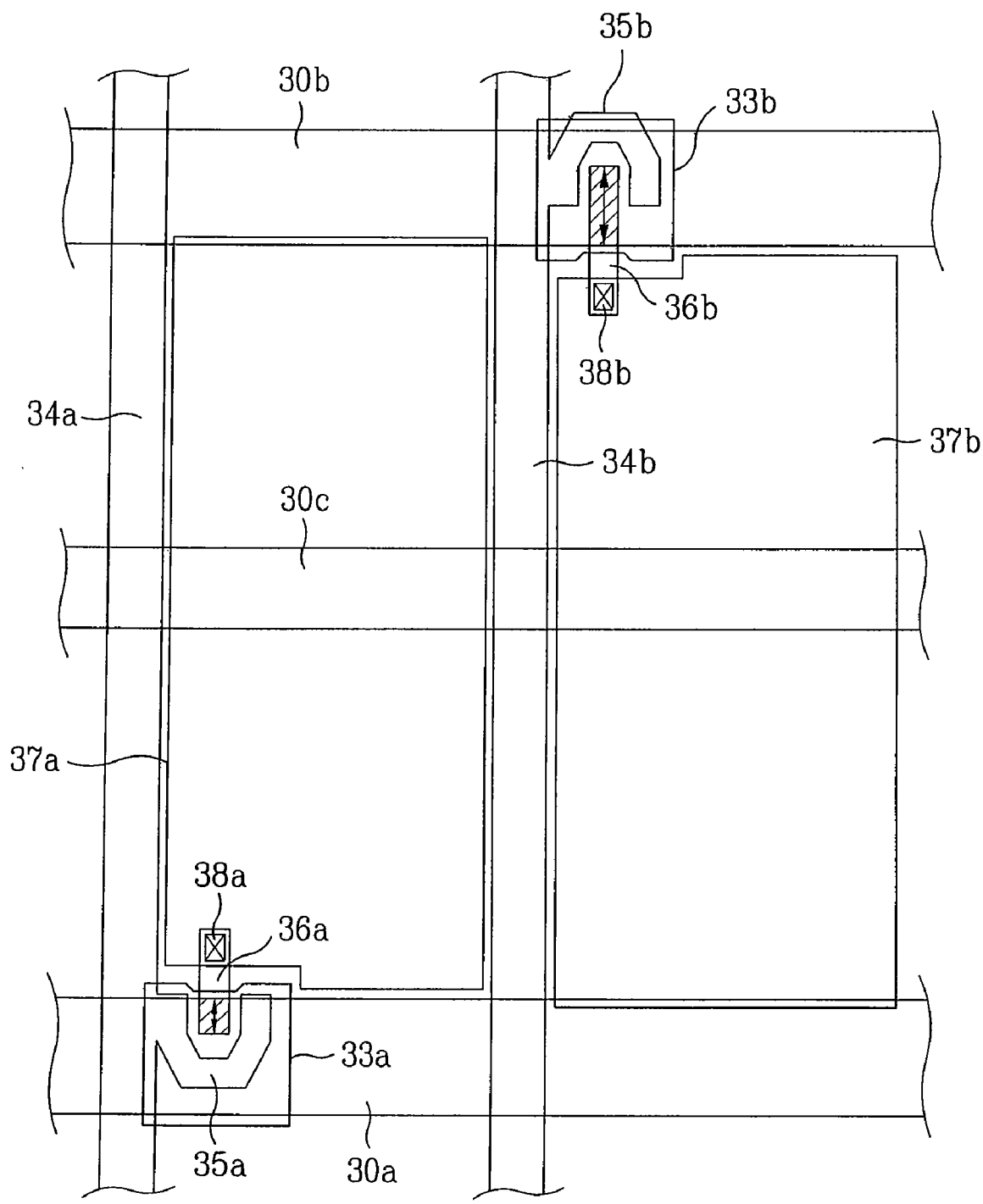
FIG. 4 illustrates a layout when a misalignment occurs in a Y-axis direction in the layout of FIG. 3.
Figure 5:
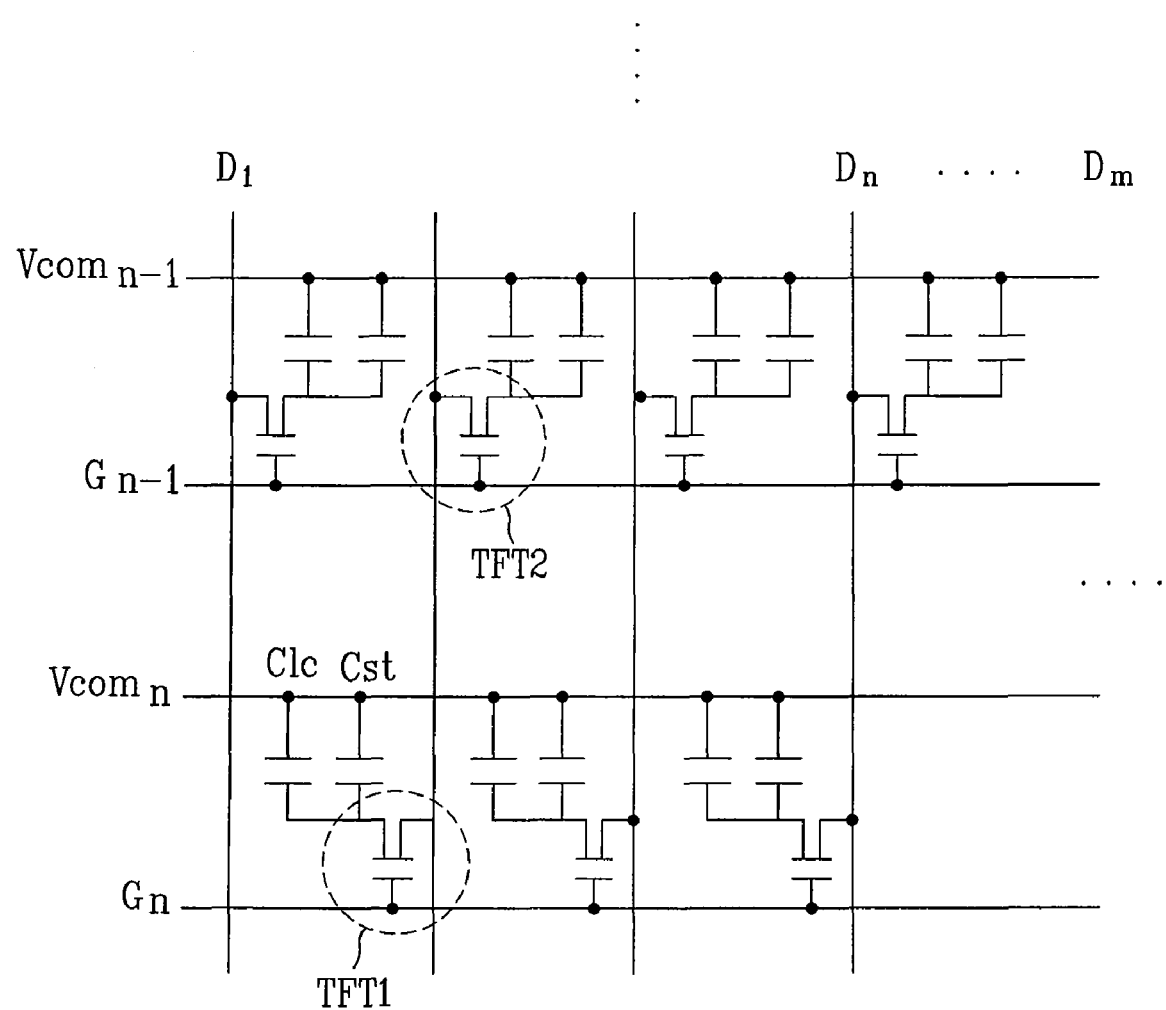
FIG. 5 illustrates a circuit of a TFT array of other related art LCD.
Figure 6:
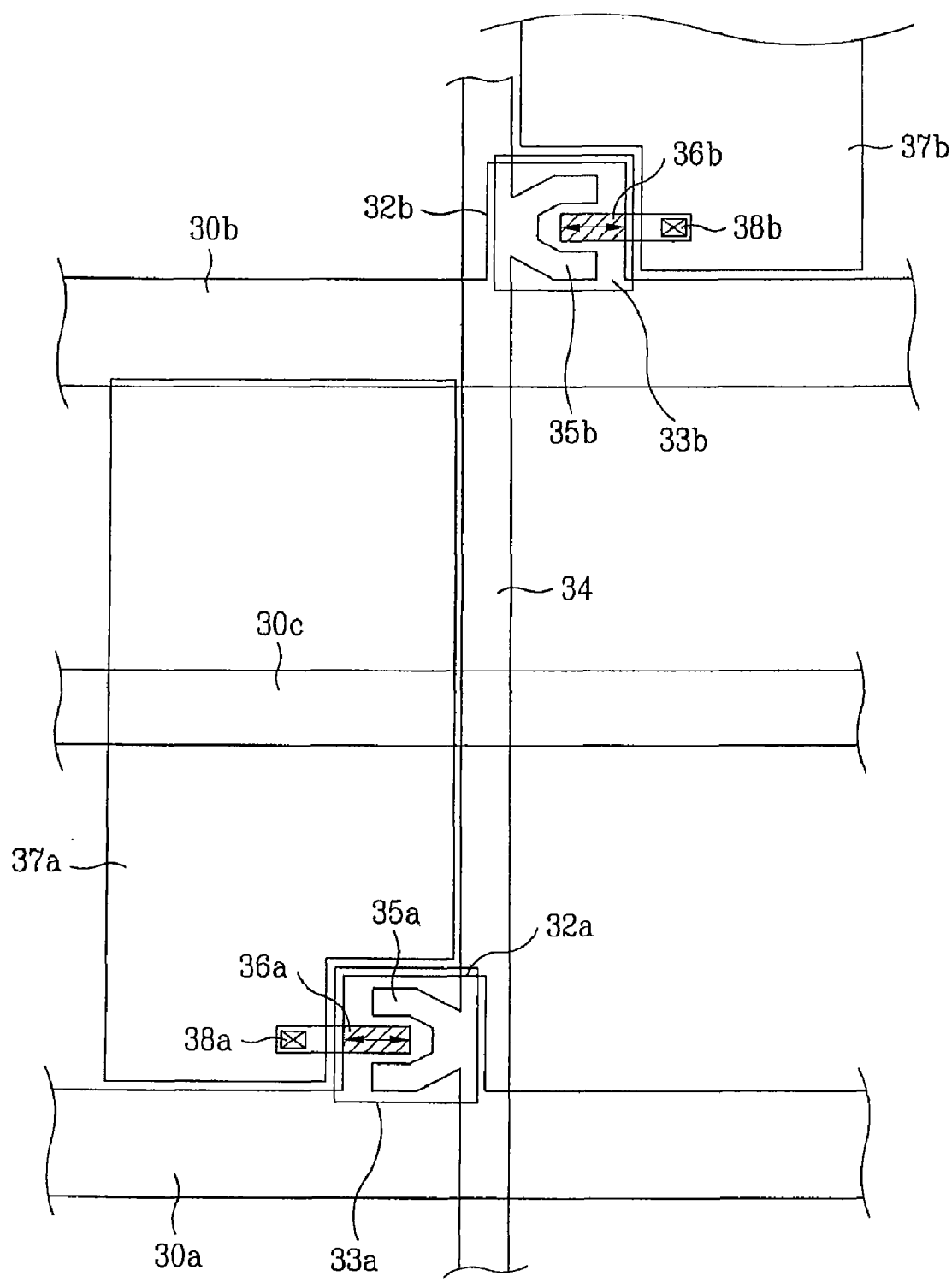
FIG. 6 illustrates a layout of the LCD of FIG. 5.
Figure 7:
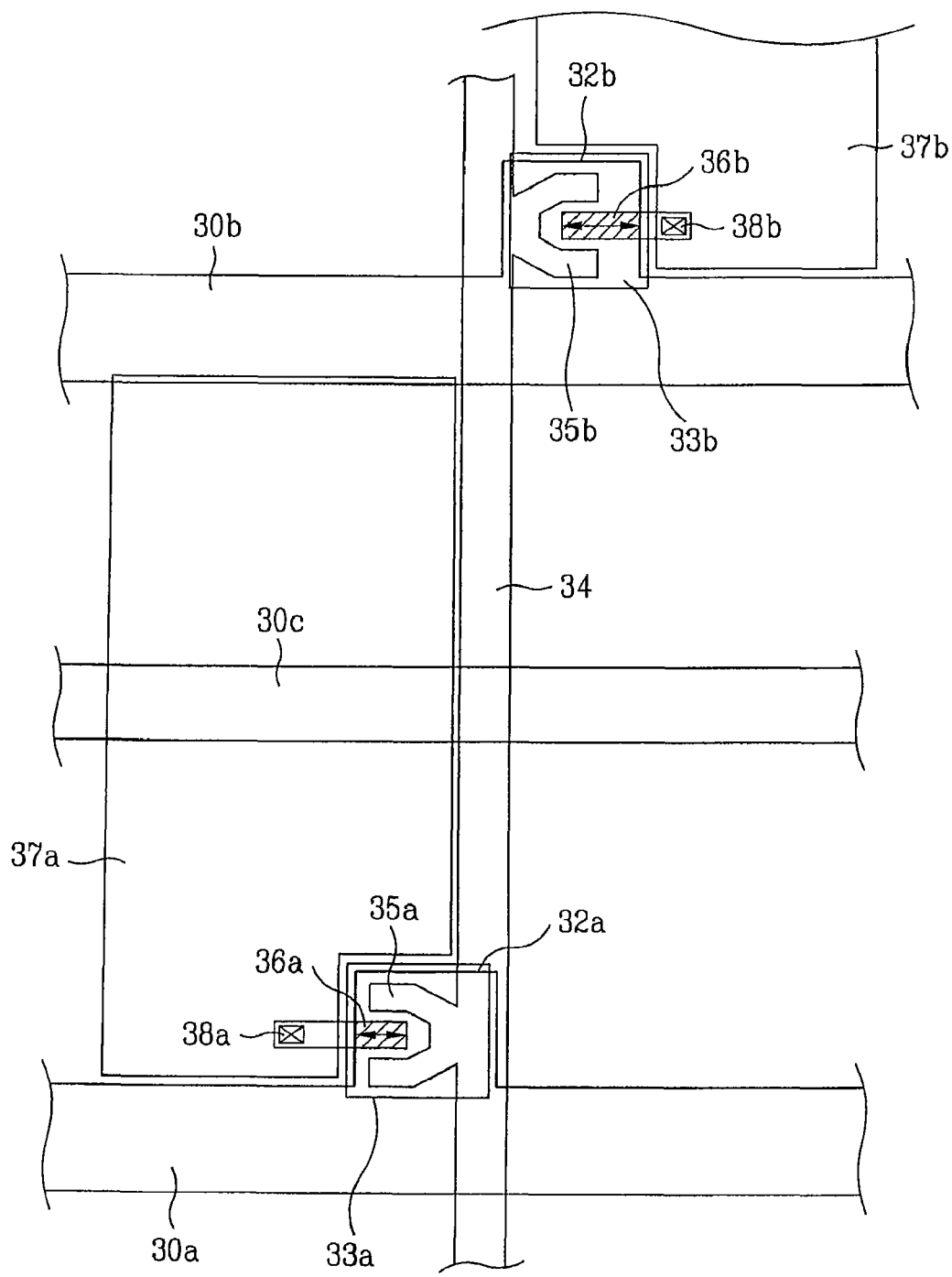
FIG. 7 illustrates a layout when misalignment occurs in the layout of FIG. 6 in an X-axis direction.

Thus, if the TFTs are arranged at left and right sides of the data line in zigzag, in the related art (FIG. 6), if misalignment occurs in the X-axis direction, there are Cgd differences between gate electrodes and drain electrodes in adjacent pixel regions because the source electrodes and channel forms differ (in ' ⊃ ' or ' ⊂ ' form). However, the following configuration of the TFTs enables to solve above problem even if the TFTs are arranged at left and right sides of the data line in zigzag.

Figure 12:
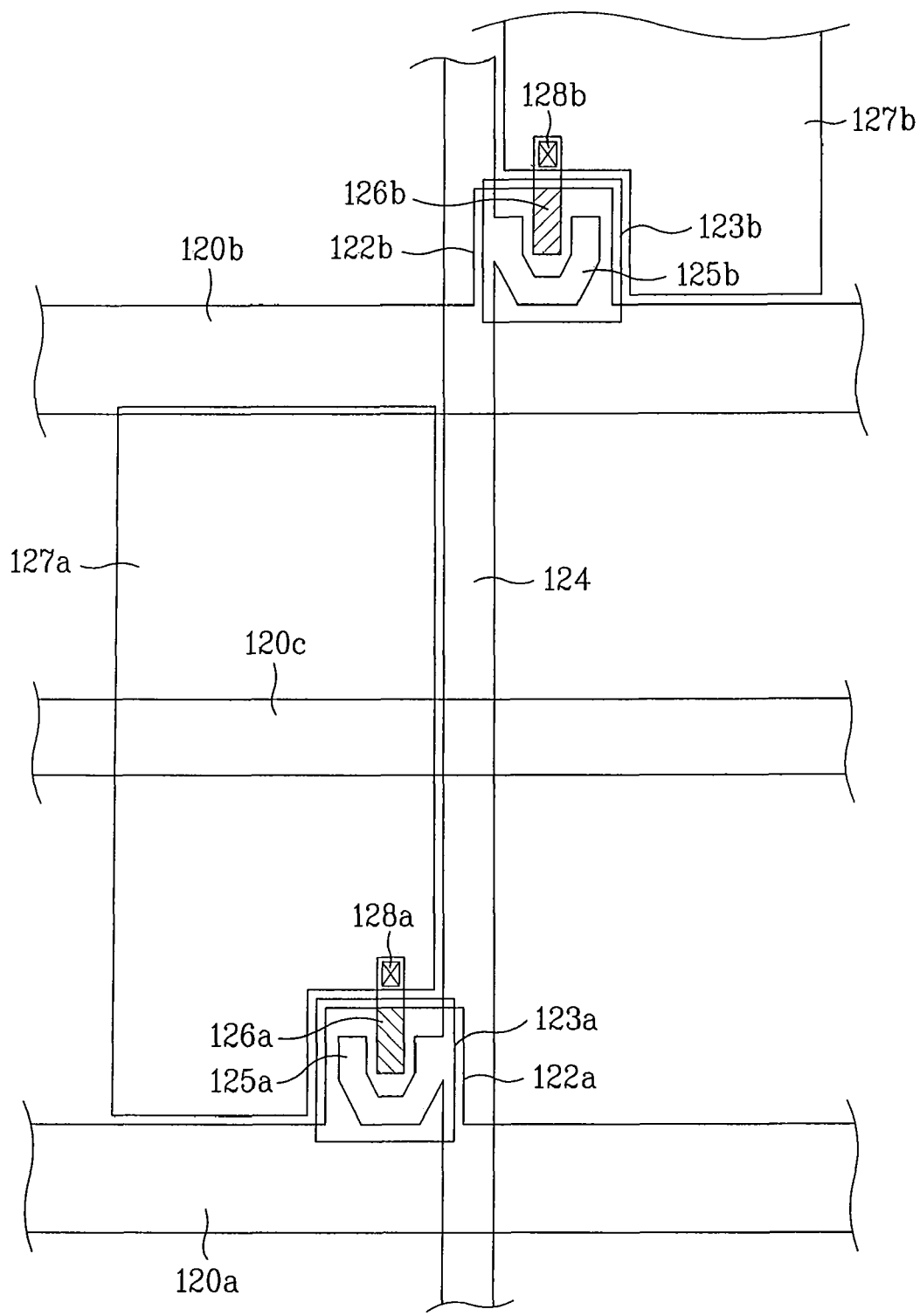
FIG. 12 illustrates a layout of an LCD of FIG. 11 in accordance with a third embodiment of the present invention.

A layout of a TFT array in accordance with a third embodiment of the present invention will be described, taking two TFTs connected to one data line and adjacent two gate lines as an example. FIG. 12 illustrates a layout of an LCD of FIG. 11 in accordance with a third embodiment of the present invention.

Referring to FIG. 12, the LCD in accordance with a third embodiment of the present invention includes first and second gate lines 120a and 120b arranged in one direction parallel to each other on a lower substrate, a common line 120c between, parallel to, and on the same layer with the first and second gate lines 120a and 120b, a data line 124 arranged perpendicular to the first and second gate lines 120a and 120b to define pixel regions, a first gate electrode 122a at a left side of the first data line 124 projected upward from the first gate line 120a, a second gate electrode 122b at a right side of the second data line 124 projected upward from the second gate line 120b, first and second active layers 123a and 123b on the first and second gate electrodes 122a and 122b respectively, a first source electrode 125a of a 'U' form projected to a left side from the data line 124 to overlap the first active layer 123a, a first drain electrode 126a arranged in a Y-axis direction (a direction parallel to the data line) so as to be spaced from the first source electrode 125a and overlapping the first active layer 123a, a first pixel electrode 127a on the pixel region so as to be connected to the first drain electrode 126a through a first contact hole 128a, a second source electrode 125b of a 'U' form projected to a right side from the data line 124 to overlap the second active layer 123b, a second drain electrode 126b arranged in the Y-axis direction to be spaced from the second source electrode 125b and overlap the second active layer 123b, and a second pixel electrode 127a on the pixel region to be connected to the second drain electrode 126b through a second contact hole 128b. The first and second drain electrodes 126a and 126b overlap the first and second gate electrodes 122a and 122b partly. The overlapped parts of the first and second drain electrodes 126a and 126b are parallel to the data line.

The pixel electrodes 127a and 127b overlap the common line 120c form storage capacitors, respectively.

The first gate electrode 122a, the first source electrode 125a, and the first drain electrode 126a form a first thin film transistor TFT1 in combination, and the second gate electrode 122b, the second source electrode 125b, and the second drain electrode 126b form a second thin film transistor TFT2 in combination. This configuration forms 'U' forms of channel regions of the first and second thin film transistors TFT1 and TFT2.

Thus, as the first and second source electrodes 125a and 125b have the same shapes, even if the thin film transistors are arranged in zigzag so that pixel regions on the same horizontal line are driven by two adjacent gate lines, the Cgd formed as the first gate electrode 122a and the first drain electrode 126a of the first thin film transistor TFT1 overlap is the same with the Cgd formed as the second gate electrode 122b and the second drain electrode 126b of the second thin film transistor TFT2 overlap.

That is, since the first and second drain electrodes 126a and 126b do not overlap with the first and second gate electrodes 122a and 122b in the X-axis direction even if misalignment occurs between the source/drain electrodes and the gate electrode in the X-axis direction, the LCD in accordance with the third embodiment of the present invention does not have a Cgd difference between the first and second thin film transistors TFT1 and TFT2 arranged on the pixel regions adjacent to each other.

Moreover, even if misalignment occurs in the Y-axis direction, since increase/decrease of the Cgd's are the same in adjacent pixel regions, there is no Cgd difference between the adjacent pixel regions.

Furthermore, the above configuration enables minimization of the Cgd variation in the liquid crystal panel at the time of Z-inversion, or swing of the common line, to improve the picture quality.

Figure 13:
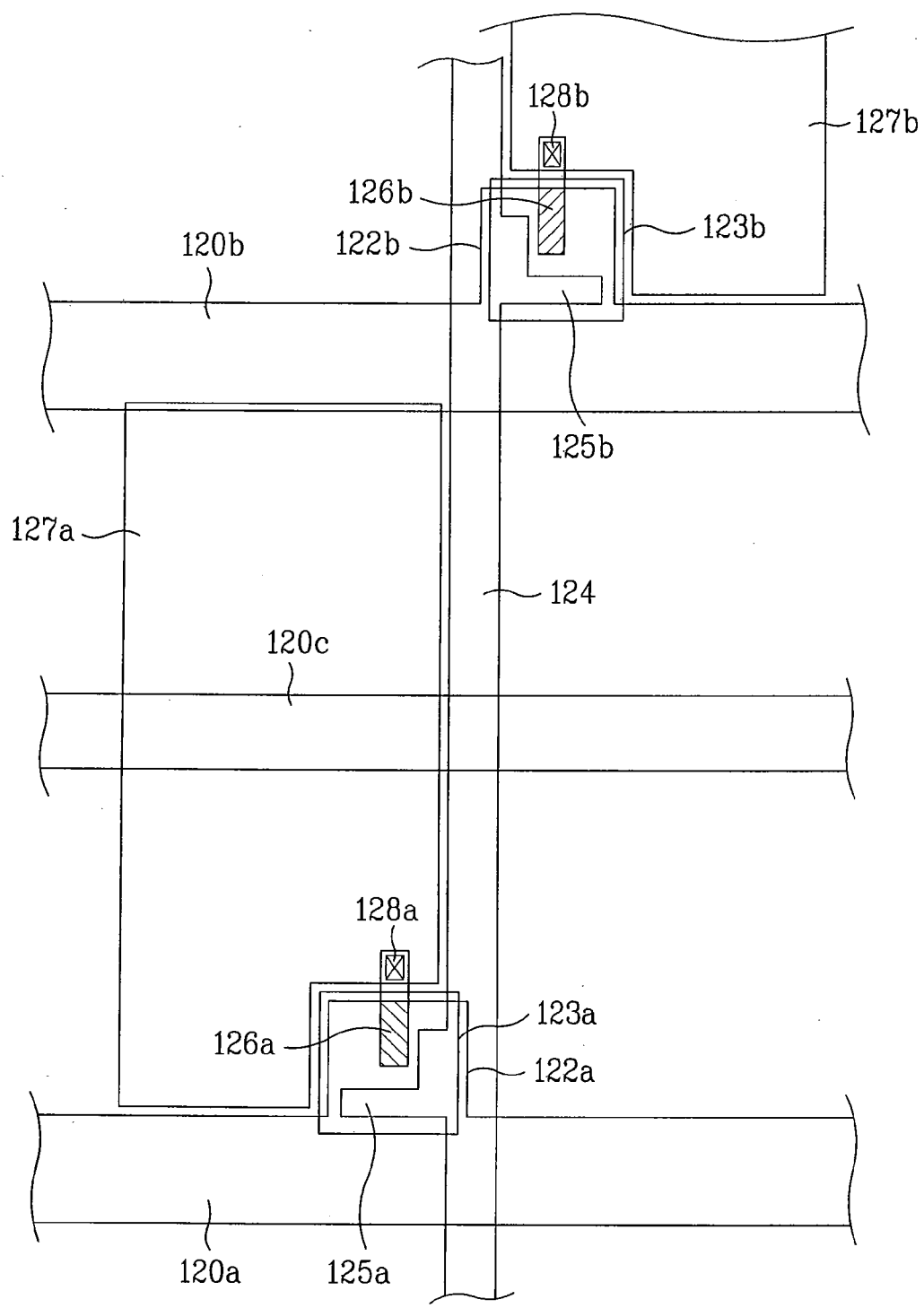
FIG. 13 illustrates a layout of an LCD of FIG. 8 in accordance with a fourth embodiment of the present invention.

Next, a liquid crystal display device in accordance with a fourth embodiment of the present invention will be described. FIG. 13 illustrates a layout of an LCD of FIG. 11 in accordance with a fourth embodiment of the present invention.

Referring to FIG. 13, the liquid crystal display device in accordance with a fourth embodiment of the present invention has the same configuration as that of the third embodiment of the present invention, except that in liquid crystal display device of the fourth embodiment, first and second source electrodes 125a and 125b of the first and second thin film transistors TFT1 and TFT2 have '⌐' or 'L'forms, with 'L'or '⌐' formed channel regions consequently.

As described in the third embodiment, the fourth embodiment LCD does not have the Cgd difference of the first and second thin film transistors TFT1 and TFT2 arranged on adjacent pixel regions even if misalignment occurs between the source/drain electrodes and the gate electrode in the X-axis direction, because the first and second gate electrodes 122a and 122b have no parts projected in the X-axis direction and overlapping each other.

Moreover, the above configuration prevents occurrence of the Cgd difference even if the misalignment occurs in the Y-axis direction because increase/decrease of the Cgd's are the same between adjacent pixel regions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As has been described, even if misalignment occurs in respective layers in Y- or X-axis direction, the Cgd difference between adjacent pixel regions can be minimized, thereby preventing a decrease in the picture quality of the LCD.

What is claimed is:

1. A liquid crystal display device comprising:
   first and second gate lines;
   a data line arranged perpendicular to the first and second gate lines to define first and second pixel regions;
   a first gate electrode of a first thin film transistor disposed on a first side of the data line and projecting from the first gate line;
   a second gate electrode of a second thin film transistor disposed on a second side of the data line projecting from the second gate line;
   first and second active layers on the first and second gate electrodes, respectively;
   a first source electrode of the first thin film transistor disposed on the one side of the data line to overlap the first active layer;
   a first drain electrode of the first thin film transistor parallel to the data line, spaced from the first source electrode, and overlapping the first active layer;
   a first pixel electrode connected to the first drain electrode;
   a second source electrode of the second thin film transistor disposed on the second side from the data line to overlap the second active layer;
   a second drain electrode of the second thin film transistor parallel to the data line, spaced from the second source electrode, and overlapping the second active layer;
   a second pixel electrode connected to the second drain electrode; and
   a continuous and uniform common line between, and parallel to the first and second gate lines, the continuous and uniform common line overlapping the first and second pixel electrodes to form storage capacitors and being on the same layer as the first and second gate lines,
   wherein both the first and second source electrodes have 'U' forms, and the first and second gate electrodes project in the same direction from the first and second gate lines, respectively.

2. The device of claim 1, wherein the first source electrode has a '⌐' form, and the second source electrode has a 'L'form.

3. The device of claim 1, wherein the first and second drain electrodes partly overlap the first and second gate electrodes, respectively.

4. The device of claim 1, wherein the first and second thin film transistors have channel regions with 'U' forms.

5. The device of claim 1, wherein the first and second thin film transistors are arranged such that a data signal is applied to pixel regions on opposing sides of the data line and connected to different gate lines.

6. The device of claim 1, wherein each of the first and second source electrodes surround an end of the first and second drain electrodes, respectively, on two sides.

7. The device of claim 6, wherein each of the first and second source electrodes surround the end of the first and second drain electrodes, respectively, on three sides.

8. A liquid crystal display device comprising:
   gate lines;
   data lines perpendicular to the gate lines to define pixel regions;
   thin film transistors connected with the gate lines and data lines, each thin film transistor having a gate electrode, a drain electrode, and a source electrode;
   pixel electrodes connected to the drain electrodes; and
   a continuous and uniform common line between, and parallel to the gate lines, the continuous and uniform common line overlapping the pixel electrodes to form storage capacitors and being on the same layer as the gate lines,
   wherein in first regions in which adjacent thin film transistors connected to different gate lines are connected to different data lines, the gate electrodes and the drain electrodes have shapes such that an offset between the gate electrodes and the drain electrodes in a direction parallel to the data lines affects a capacitance formed between the gate electrodes and the drain electrodes substantially equally, and
   in second regions in which adjacent thin film transistors connected to different gate lines are connected to the same data line, the gate electrodes and the drain electrodes have shapes such that an offset between the gate electrodes and the drain electrodes in a direction parallel to the gate lines affects a capacitance formed between the gate electrodes and the drain electrodes substantially equally.

9. The device of claim 8, wherein in the first regions, the gate electrodes and drain electrodes have shapes such that an offset between the gate electrodes and the drain electrodes in any direction affects the capacitance substantially equally.

10. The device of claim 9, wherein in the second regions, the gate electrodes and drain electrodes have shapes such that an offset between the gate electrodes and the drain electrodes in any direction affects the capacitance substantially equally.

11. The device of claim 8, wherein in the second regions, the gate electrodes and drain electrodes have shapes such that the offset between the gate electrodes and the drain electrodes in any direction affects the capacitance substantially equally.

12. The device of claim 8, wherein in the first regions, the gate electrodes extend from the gate lines in the same direction.

13. The device of claim 8, wherein in the second regions, the gate electrodes extend from the gate lines in opposite directions.

14. The device of claim 8, wherein the source electrodes surround an end of the drain electrodes on two sides.

15. The device of claim 14, wherein the source electrodes surround the end of the drain electrodes on three sides.

16. The device of claim 15, wherein the source electrodes are symmetric around the end of the drain electrodes.

17. The device of claim 8, wherein the drain electrodes in the first regions comprise portions that do not extend parallel with the gate lines.

18. The device of claim 17, wherein the portions of the drain electrodes extend parallel with the data lines.

19. The device of claim 17, wherein the portions of the drain electrodes are connected to the pixel electrodes.

20. The device of claim 18, wherein the gate electrodes overlap the data lines.

* * * * *